(12) United States Patent
Knowles et al.

(10) Patent No.: US 7,451,966 B1
(45) Date of Patent: Nov. 18, 2008

(54) ISOLATOR MOUNT FOR SHOCK AND VIBRATION

(76) Inventors: Gareth J. Knowles, 4121 Jacks Hollow Rd., Williamsport, PA (US) 17702; Bruce Bower, 4121 Jacks Hollow Rd., Williamsport, PA (US) 17702

(*) Notice: Subject to any disclaimer, the term of this patent is extended or adjusted under 35 U.S.C. 154(b) by 691 days.

(21) Appl. No.: 10/188,446

(22) Filed: Jul. 2, 2002

Related U.S. Application Data

(60) Provisional application No. 60/302,579, filed on Jul. 2, 2001.

(51) Int. Cl.
*F16F 1/00* (2006.01)

(52) U.S. Cl. .................. 267/136; 267/140.11; 188/267

(58) Field of Classification Search .......... 267/136, 267/140.11, 153; 188/267
See application file for complete search history.

(56) References Cited

U.S. PATENT DOCUMENTS

| | | | | |
|---|---|---|---|---|
| 1,497,152 | A * | 6/1924 | Alfred et al. ................. 267/30 |
| 3,730,509 | A * | 5/1973 | Jorn ........................... 267/152 |
| 4,278,726 | A * | 7/1981 | Wieme ....................... 267/153 |
| 4,310,730 | A * | 1/1982 | Aaroe ........................ 381/152 |
| 4,854,556 | A * | 8/1989 | Pietrzak ...................... 267/33 |
| 4,923,057 | A * | 5/1990 | Carlson et al. .............. 188/378 |
| 5,030,490 | A * | 7/1991 | Bronowicki et al. ........ 267/136 |
| 5,042,783 | A * | 8/1991 | Ciolczyk et al. ............. 267/81 |
| 5,068,018 | A * | 11/1991 | Carlson ....................... 204/554 |
| 5,087,491 | A * | 2/1992 | Barrett ........................ 428/34.5 |
| 5,102,107 | A * | 4/1992 | Simon et al. ................ 267/152 |
| 5,203,435 | A * | 4/1993 | Dolgin ....................... 267/141.2 |
| 5,217,184 | A * | 6/1993 | Hararat-Tehrani ........ 244/118.1 |
| 5,250,132 | A * | 10/1993 | Lapp et al. .................. 156/173 |
| 5,275,388 | A * | 1/1994 | Kobayashi et al. ....... 267/140.14 |
| 5,358,210 | A * | 10/1994 | Simon et al. ................ 248/628 |
| 5,712,038 | A * | 1/1998 | Yamazaki et al. .......... 428/411.1 |
| 5,750,272 | A | 5/1998 | Jardine |
| 5,858,521 | A * | 1/1999 | Okuda et al. ................ 428/219 |
| 6,026,939 | A * | 2/2000 | Girvin et al. ............... 188/266.7 |
| 6,102,379 | A * | 8/2000 | Ponslet et al. ............... 267/136 |
| 6,126,371 | A | 10/2000 | McCloskey |
| 6,138,996 | A * | 10/2000 | Hayashi et al. ............. 267/136 |
| 6,161,664 | A * | 12/2000 | Brevart et al. ............... 188/379 |
| 6,175,989 | B1 * | 1/2001 | Carpenter et al. ............ 16/225 |
| 6,524,692 | B1 * | 2/2003 | Rosen ........................ 428/298.4 |
| 6,695,106 | B2 * | 2/2004 | Smith et al. ................. 188/378 |

* cited by examiner

*Primary Examiner*—Bradley T King
(74) *Attorney, Agent, or Firm*—Michael Crilly, Esq.

(57) ABSTRACT

An isolator mount with shock and vibration applications is presented. Specifically, the invention is comprised of an energy dissipating material disposed between deflectable elements. The invention is capable of damping small disturbance excitations and mitigating large shocks. The invention transfers mechanical energy to the dissipating materials via device structure and matrix. Materials dissipate shock and vibration either as heat or magnet energy. The invention includes a semi-passive mode for harsh environments and an active mode for benign environments. A snap-together modular embodiment with quasi-static adjustability enables two or more isolators to address a wide variety of conditions and to respond to changing conditions.

7 Claims, 8 Drawing Sheets

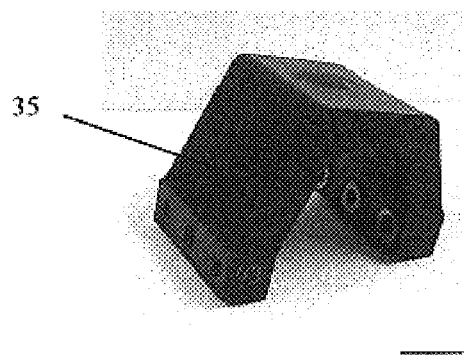
FIG. 13A
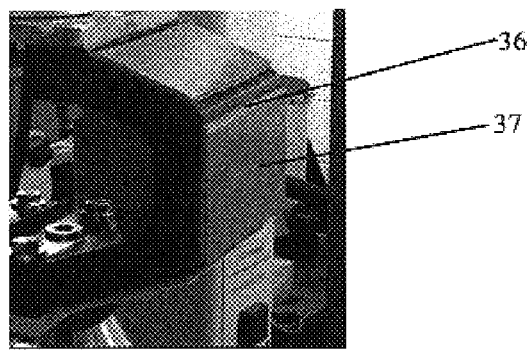
FIG. 13B
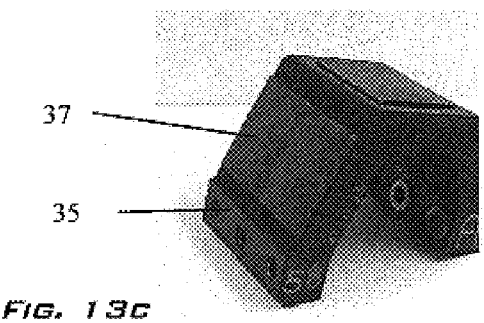
FIG. 13C
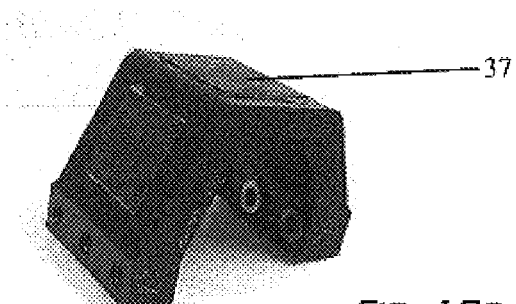
FIG. 13D
FIGURE 13
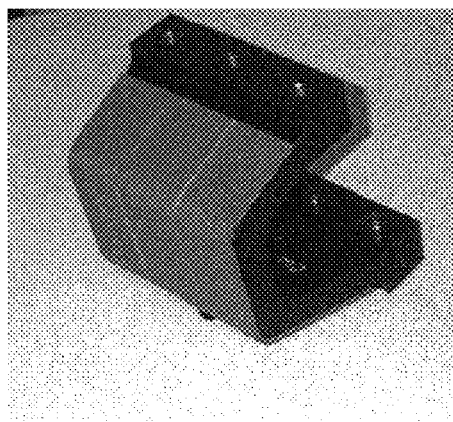
FIG. 14A
FIG. 14B
FIGURE 14

ISOLATOR MOUNT FOR SHOCK AND
VIBRATION

CROSS-REFERENCE TO RELATED
APPLICATIONS

This application claims benefit under 35 U.S.C. 119(e) from U.S. Provisional Application No. 60/302,579 filed on Jul. 2, 2001.

FEDERALLY SPONSORED RESEARCH OR
DEVELOPMENT

None.

BACKGROUND OF THE INVENTION

1. Field of the Invention

The present invention generally relates to an isolator mount. Specifically, the invention is comprised of an alloy or rare earth material integrated within an isolation mechanism so as to impede both shock and vibration. The invention includes a semi-passive mode for harsh environments and an active mode for benign environments. Manufacturing processes are described facilitating the integration of alloys and rare earth materials within a plastic, composite, and metal.

2. Related Arts

Naval ships employ a wide variety of isolator mounts to impede acoustic transmissions and to protect sensitive equipment from shock and vibration. Presently, isolator mounts are specifically designed for a limited range of shock and vibration conditions. Consequently, a variety of mounts are required to satisfy a wide range of mechanical load conditions. Furthermore, energy dissipation mechanisms employed within such devices quickly degrade their performance thereby requiring constant replacement. Specifically, passive mounts comprised of rubber and metal rapidly lose their damping capacity. Consequently, isolator mounts are often used well beyond their effective lifetime thereby compromising the integrity and performance of shipboard systems.

Active isolator mounts with integrated electronics increase the range of shocks and vibrations effectively isolated. However, active mounts are generally less durable and sensitive to environmental conditions. Wires externally attached to such devices are susceptible to breakage. Electronics within such devices are susceptible to the very shocks and vibrations dissipated. And electronics within such devices are susceptible to damage by saltwater, ozone, and oil.

Low-frequency shocks, typically in the range of 3 to 10 Hz, and vibrations, typically in the range of 5 to 30 Hz, exclude many conventional passive and active damping devices. For example, the effectiveness of viscoelastic damping increases with frequency and thereby of limited utility at low frequencies. Passive damping with piezoelectric or electrostrictive devices, also known as direct effect damping, is not particularly useful at low bandwidths since damping is dependent upon hysteresis loops and elastic-mechanical-to-electrical energy coupling. Coupling coefficients are generally poor and total loss is insignificant at the lower dynamic range.

Piezo-polymers are better direct coupling materials than piezoceramics and electrostrictors, therefore applicable to piezo-passive damping devices. In a passive-mode device, a generalized matched impedance circuit couples to the active ferroelectric materials transferring elastic energy as heat. In a semi-active mode, the circuit is variably tunable. However, force and strength-stiffness characteristics preclude the use of ferroelectric polymers such as PVDF and urethane as active devices.

The present invention reveals a method of manufacture for a thermoplastic mount incorporating an externally constrained viscoelastic damping layer and/or ferromagnetoelastic damping laminate. These treatments are individually applied or applied in combination to commercially available or other thermoplastic material mounts. The disadvantage of the laminate process is some small loss in isolation (<5%) with a corresponding large increase in wide band damping (>40%) to nearly dc.

The present invention is fabricated by a non-conventional method of extrusion enabling the netshape production of thermoplastic, including formulations in the Hytrel® family, damping elements about an energy dissipating material. The described method not only introduces a more reliable method for fabrication of mounts such as commercial C-mounts using extrusion (see FIG. 12), but enables the present invention to mimic enhanced performance of ferromagnetoelastic damping laminate in a full composite construction, whereby damping alloys are introduced as particulates or fibers during the pre-mixing process. Although, the present invention could be similarly applied to injection molding techniques, the further advantage of the invention of extrusion in contrast to injection, is that with extrusion the ferromagnetoelastic materials can be aligned into virtual chains which is known to increase damping effectiveness.

What is required is an isolator mount possessing both soft-damping for small disturbance excitations and stiffness to mitigate large shocks. The invention achieves a high level of damping for both shock and vibration, yet retains static stiffness characteristics. The invention should function over a wide range of temperature and load conditions. The invention should facilitate quasi-static tuning for adaptive passive damping.

SUMMARY OF THE INVENTION

An object of the present invention is a passive damping device capable of mitigating shock and vibration within a harsh environment.

A further object of the present invention is an actively, passive damping device capable of mitigating shock and vibration within a benign environment.

The present invention is a self-contained, modular shock and vibration mount. The mount is compatible with existing systems and equipment so as to meet shock and vibration mitigation requirements and to substantially reduce inventory needs. The invention is configurable into various geometries, including cylindrical embodiments for pipes and block-like embodiments for machinery and electronics cabinets. A snap-together modular embodiment with quasi-static tuning adjustment enables the invention to address a wide variety of conditions and facilitates responsiveness to changing conditions. Quasi-static tuning adjustments are commanded automatically or remotely by a plug-in sensor or micro-controller. The invention is both durable and resilient having excellent passive shock response from near dc to mid-range (3 Hz-40 Hz) and vibration suppression for small excursions into the kilohertz range. The invention is composed of materials and damping methods that achieve vibration mitigation while retaining design durability.

The invention incorporates a high-loss method comprised of materials capable of absorbing and dissipating energy, such materials referred to as lossy. For example, lossy materials may provide passive damping when a structure integrates one or more passive alloys, composed of magneto-mechanical or superelastic alloys with an innate ability to couple mechanical energy to heat or magnetism so as to enhance shock and vibration isolation. Alloys are combined with highly durable fiber-reinforced elastomeric materials to further enhance shock and vibration isolation. Isolators are composed of rare earth coatings, laminated materials, or ferrous treated rare earth particulates.

In an alternate embodiment, an electric or magnetic field is passed through the above described materials so as to actively maximize their passive damping behavior. For example, a field may be applied to active alloys (magneto-mechanical and shape memory) embedded within a matrix. The tuning of passive parameters is distinct from driving such mechanisms actively, since the former is essentially a quasi-static application to induce changes in performance in response to load changes or environmental factors.

The present invention relies on fiber-reinforced elastomeric damping rigidized by fiber inclusions to retain high stiffness yet take advantage of viscoelastic damping. The fiber-reinforced elastomer consists of random or oriented short fibers integrated into a resin transfer mold or injection manufacture matrix such as a thermoplastic. The fiber-reinforced elastomer may pre-stress alloy inclusions so as to improve their shock and vibration characteristics.

Magneto-mechanical passive damping is applicable to both shock and vibration. For example, magnetic iron alloys are not only durable but also transform elastic energy into magnetic energy on each cycle according to the ratio $k^2/(1-k^2)$. If the magnetic system has a high-loss factor, less energy is returned to the load transfer path and shock or vibration is effectively damped. The primary loss phenomenon is energy dissipation via hysteresis, generally independent of frequency but strongly dependent upon amplitude.

Superelastic passive damping is applicable to shock mitigation. Superelastic alloys function as a high-loss damping material. The strain required for damping is too large for some applications. However, it is perfect for ship-based shock mitigation applications where several inches of displacement are common. The stress cycle of the superelastic alloy involves a large elastic hysteresis that transforms elastic mechanical energy into heat without raising the temperature of the material significantly. Such materials damp motions from near-dc up to 80 hertz.

Alloy inclusions may utilize a range of new and emerging smart materials alloys, which produce a change of dimension, shape or stress due to an applied magnetic field. Such materials include magnetostrictive Fe—Tb—Dy alloys (TerFeNol-D was originally developed by Naval Ordnance Lab., USA) and Magnetic Shape Memory (MSM) materials. MSM materials combine the large and complex shape changes of shape memory alloys and the fast and precise response of magnetic control. With this approach, it will be possible to have quasi-static control of these mounts so as to customize their use for changing load conditions.

Another material which can be used in the present invention is ferromagnetic shape alloys (FMSA). The properties of these materials can be found for example in *Field-Induced Strain Under Load in Ni—Mn—Ga Magnetic Shape Memory Materials*, S. J. Murray, M. Farinelli, C. Kantner, J. K. Huang, S. M. Allen, and R. C. O'Handley, J. Appl. Phys. 83, 7297 (1998). A class of such FMSA materials that is of special interest to the present invention of alloy damped composite is based on the known shape-memory, high-magnetization Fe—Ni—Co alloys. This alloy possesses large hysteresis (hence loss or damping) which would improve the efficacy of the invention performance. Such Fe-based FMSAs represent a less expensive, broader temperature range, and higher authority (larger saturation magnetization implies stronger response to applied magnetic fields) alternative to Ni—Mn—Ga alloys.

The present invention is manufactured via several methods including lamination, coating, and composite molding. Composites are constructed as pseudo-fiber composites, as described by R. E. Newnham in *Molecular mechanisms in Smart Materials*, MRS Bulletin 20-34, 1997, and may incorporate structural foam to both induce pressure and reduce bubble formation.

The alignment of particulates so as to enable pseudo-fiber construction is generally known, see *Magnetostriction, Elastic Moduli and Coupling Factors of Composite TerFeNol-D Composites*, J. Appl. Phys 83, 1999. In the present invention, an alloy such as FMSA, MSM, cobalt ferrite, or TerFeNol is mixed with low-viscosity resin. After sieving, the mixture is degassed and prepared for particle alignment. Particles are aligned by applying a large magnetic field causing the ferroelectric particles to align with the magnetic flux lines. The assembly is cured after particulates have been aligned during thermoset and/or extrusion.

The preferred fabrication method is extrusion between two large magnetic field devices, such as induced by permanent magnets. The magnetic field and direction of extension aligns the embedded magnetic particulates into so-called pseudo chains oriented in the direction most desirable to damping enhancement. The invention maximizes passive damping characteristics of the finished article. In some alloys, it may be advisable to add ferrite so as to facilitate the alignment process. As such, it is distinct from the related arts.

The present invention uses the passive capability of rare earths and metallic alloy composite materials. Terbium, Dysprosium, and ferromagnetic particulates become increasingly magnetic with decreasing temperature. At low enough temperature pseudo-fiber particle alignment by the rare earth particulates within a resin is achieved in the absence of any additional ferromagnetic particle fraction. However, this behavior eliminates many useful thermoplastics, as they do not set at such low temperatures. More exotic matrix materials must be used in this process adding to the cost of manufacture. Thus, another embodiment of the isolation mechanism has randomly distributed TerFeNol, FMSA, or other randomly distributed damping alloy particulates.

The preferred manufacture process (either RTV or profile extrusion or injection mold) integrates superelastic materials. Materials include either ribbon or short fiber inclusions within the resin mix. Size, volume fraction and preload on the NiTi material is determined just as with the rare earth or rare earth-ferromagnetic inclusions by the pre-stress exerted by the epoxy shrinking onto the particulates. Pre-stress is further enhanced with structural foam. External loads due to the mounting itself are in addition to the preload induced by the epoxy. The increase in pre-stress will generally improve both passive magnetoelastic damping by the TerFeNol or rare earth inclusions and shock isolation due to the superelastic inclusions. The relative softness of such materials allows for an embodiment whereby the NiTi in a suitably chosen superelastic phase is laminated onto the mount. The laminate is further coated or laminated with an additional layer of durable material such as urethane.

Extrusion manufacture offers a low-cost agile approach to the development of internally damped thermoplastic products. Polymer extrusion is a viable method for manufacturing the C-mount. This technique utilizes an extruder to plasticate the polymeric material with correctly aligned molecular orientation as it extrudes from a shaping die. A traveling saw is used to cut lengths of C-mount from the continuous extrusion.

BRIEF DESCRIPTION OF THE DRAWINGS

The invention will now be described in more detail, by way of example only, with reference to the accompanying drawings, in which:

FIG. 13 shows several constrained mounts having both damping layer and plate.

FIG. 14 compares a related art unconstrained polymer damping mount to the present invention.

REFERENCE NUMERALS

Figure 1:
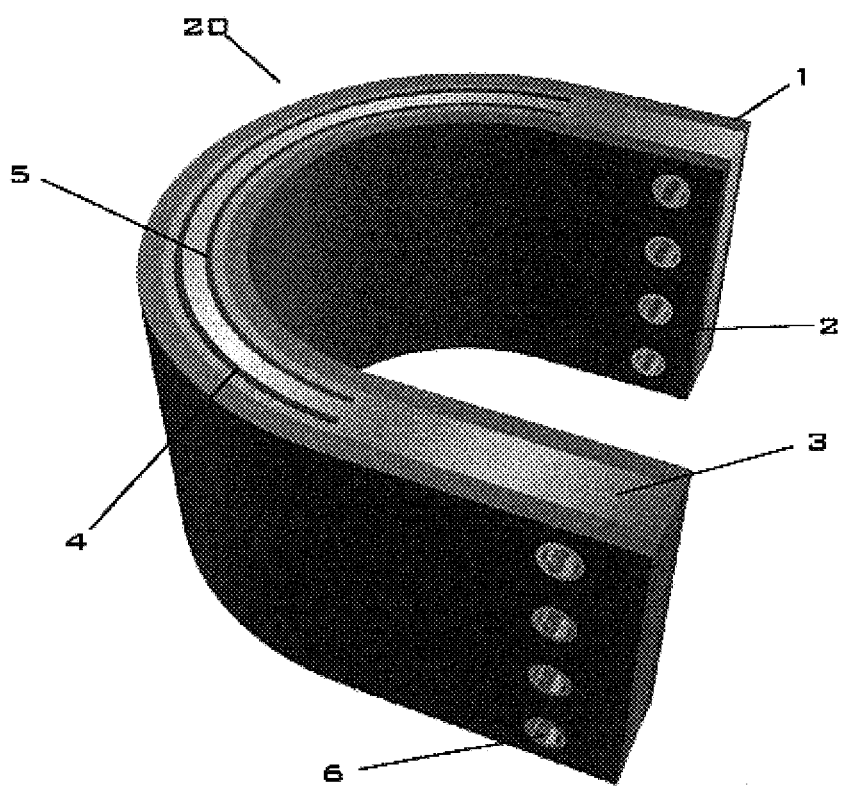
FIG. 1 shows a perspective view of a representative passive C-mount.

1 First layer
2 Second layer
3 Third layer
4 First insert
5 Second insert
6 Fastener
7 Composite shell
8 Rigid element
9 Damping element
10 Top cover
11 Bottom cover
12 Electronics module
13 Fill
14 Outer damping shell
15 Inner damping bulkhead
16 Damping seal
17 Flange
18 Connector
19 Copper winding
20 C-mount isolator
21 Open end
22 Bond layer
23 Coating
24 Coating
25 Magnet
26 First half
27 Second half
30 D-mount isolator
31 Multi-mount block
32 Block
35 Mount
36 Damping layer
37 Damping plate
40 Component
50 Mounting surface
101 Alignment device
102 Machine
103 Composite
104 Damping material
105 Alignment device
106 Extrusion direction

DESCRIPTION OF THE INVENTION

Referring now to FIG. 1, a laminate embodiment of a C-mount isolator 20 is comprised of a first insert 4 and second insert 5 embedded within a third layer 3 and thereafter sandwiched between a first layer 1 and a second layer 2. While C-shaped mounts are described, other shapes are possible.

First layer 1 and second layer 2 are composed of an energy absorbing material capable of withstanding repeated deflections and large strains. Preferred materials include spring steel and thermoplastics. First layer 1 and second layer 2 provide structural rigidity during normal loading conditions.

The third layer 3 is composed of a composite, polymer, or elastomer. Preferred embodiments are comprised of a fiber-reinforced elastomer. The primary function of the third layer 3 is to provide sufficient stiffness so as to transfer strain into first insert 4 and second insert 5 while providing a level of elastomeric damping effective at higher frequencies.

First insert 4 and second insert 5 are composed of various materials. For example, a magnetostrictive material may consist of either a magnetostrictive material alone or a magnetostrictive composite composed of TerFeNol, cobalt ferrite, FMSA, MSM, or Metglas. In alternate embodiments, first insert 4 and second insert 5 may be composed of a magneto-memory material, preferably constrained within a third layer 3 composed of a short-fiber, reinforced elastomer.

In yet other embodiments, first insert 4 and second insert 5 are composed of different damping alloys. For example, the first insert 4 may be a magneto-mechanical alloy and the second insert 5 a shape memory alloy both embedded within a third layer 3 composed of a fiber-reinforced elastomer. The first layer 1, second layer 2, and third layer 3 are molded to shape and machined, via techniques understood in the art, so as to enable attachment at either end via fasteners 6. Preferably, fasteners 6 should allow for the passage of a bolt for securing the isolator between mounting surface 50 and shipboard component 40. Thickness and relative modulus of the laminate materials are design dependent and chosen to maximize coupling of elastic energy due to shock and vibration into heat and magnetic energy within the damping materials. The invention may employ a selection of inserts integrated with a mount either internally as shown in FIG. 1 or externally as laminates as shown in FIG. 13.

As is understood in the art, magneto-mechanical alloys and composites dissipate mechanical energy as magnetic energy, whereas superelastic alloys and elastomers dissipate energy as heat. Magnetostrictive composites are formed by mixing one or more powdered, magnetic materials, examples including but not limited to TerFeNol-D, SmPd, $SmFe_2$, and CbFe.

Application dependent properties are tailored by elastomer type, varying the volume fraction of ferromagnetic powder, the use of insulated magnetic binders, and solidification within a magnetic field for either an isotropic (randomly oriented) or an anisotropic (oriented) magnetostrictive particle distribution. The preferred embodiment provides solidification into pseudo-chains using an applied magnetic field during an oriented extrusion process. The heating process itself may include the presence of a magnetic field with the powder ground in an inert atmospheric environment. Magnetic and electrical properties of feedstock are chosen to optimize eddy current losses and maximize magnetic hysteresis attributes.

Figure 3:
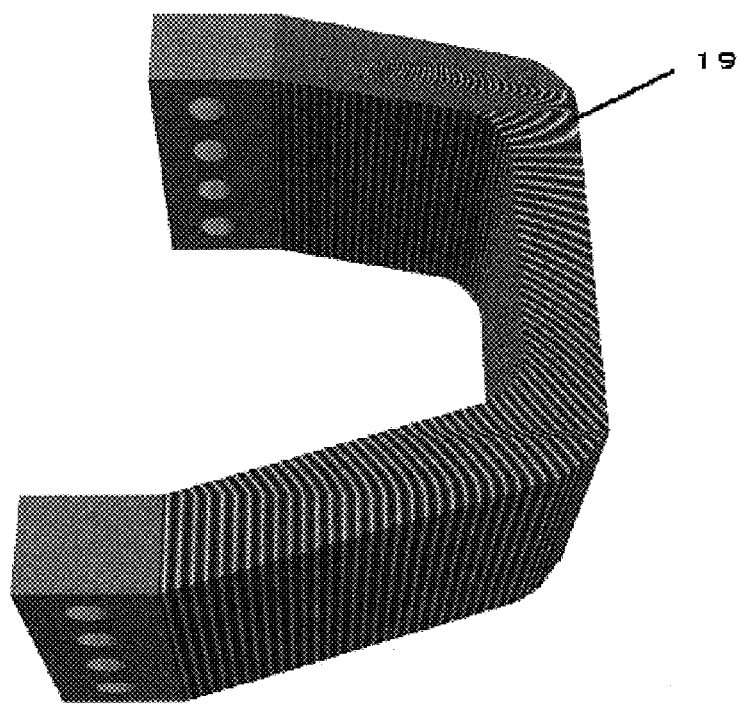
FIG. 3 shows a perspective view of the alternate embodiment with copper wire windings for RTV process fabrication.
Figure 4:
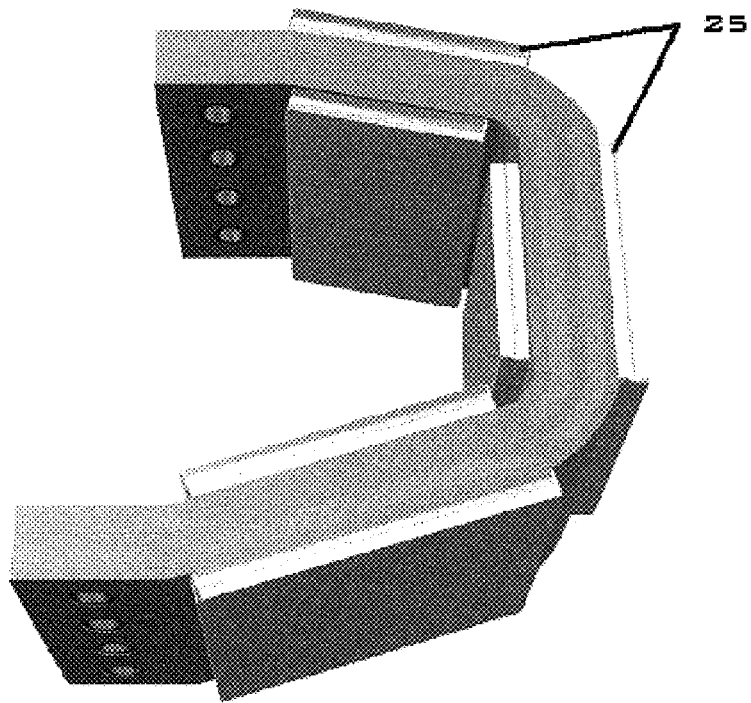
FIG. 4 shows a perspective view of the alternate embodiment with magnets for RTV process manufacturing.

Several methods are available to align magnetized particulates. FIG. 3 shows a copper winding 19 about the exterior of a C-mount isolator 20. The copper winding 19 aligns the magnetostrictive, rare earth or rare earth/ferromagnetic particulates in a tangential fashion. Flux lines run lengthwise along the C-mount isolator 20 so that virtual chains of alloy or rare earth inclusions are aligned lengthwise along the isolator. FIG. 4 describes an alternate method wherein one or more magnets 25 are aligned along the C-mount isolator 20 so as to induce a radial alignment of virtual chains within the alloy.

Figure 5:
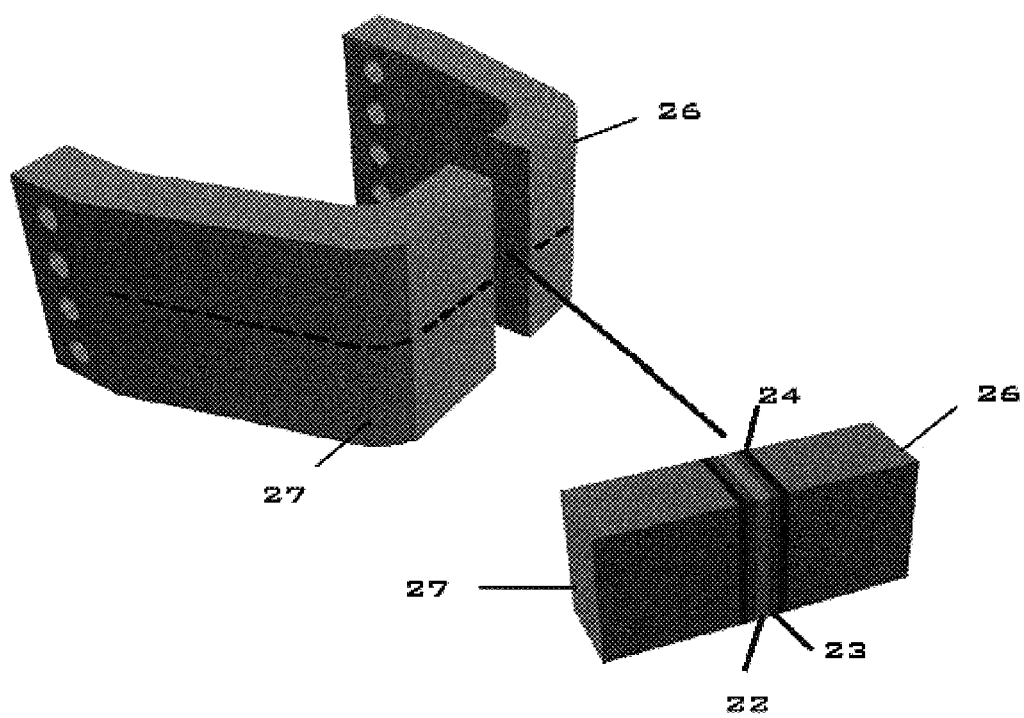
FIG. 5 shows a perspective view of the alternate embodiment with internal coating of rare earth damping materials.

A third method is provided whereby the C-mount isolator 20 is externally or internally coated, using techniques known within the art, with a rare earth, examples including Terbium or Dysprosium. FIG. 5 shows an internal coating approach whereby the C-mount isolator 20 is composed of a first half 26 and a second half 27 and thereafter coated with successive coatings 23, 24 of like or different rare earth materials. In some embodiments, small amounts of ferromagnetic material, such as TerFeNol, FMSA, and magnetic shape memory materials may be added to each layer. Once the coating process is completed, first half 26 and second half 27 are bonded together with a bond layer 22, one example including a fiber-reinforced elastomer.

Figure 7:
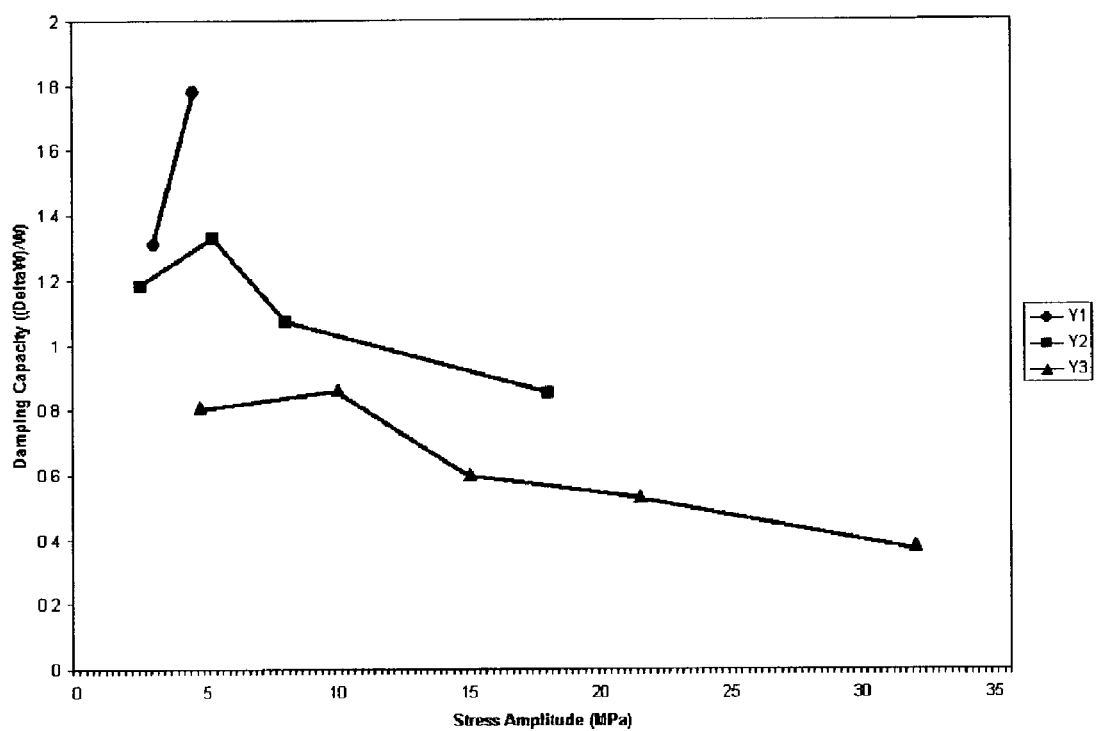
FIG. 7 compares damping capacity of several magneto-mechanical alloys.

Typical embodiments of the present invention include external laminate construction using magneto-mechanical alloys TerFeNol, superelastic, and constrained layer viscoplastic laminates with an optimized loss factor at room temperature. FIG. 7 shows several TerFeNol samples having a damping capacity well above unity thereby indicating applicability to high-stress applications. In general, magnetoelastic and ferromagnetic materials dissipate better at bias stress, hence a third layer 3 composed of fiber-reinforced silicon rubber may be used to pre-stress the alloy as well as provide a protective anti-corrosion cover. Pre-stressing is also achieved with structural foam.

Figure 2:
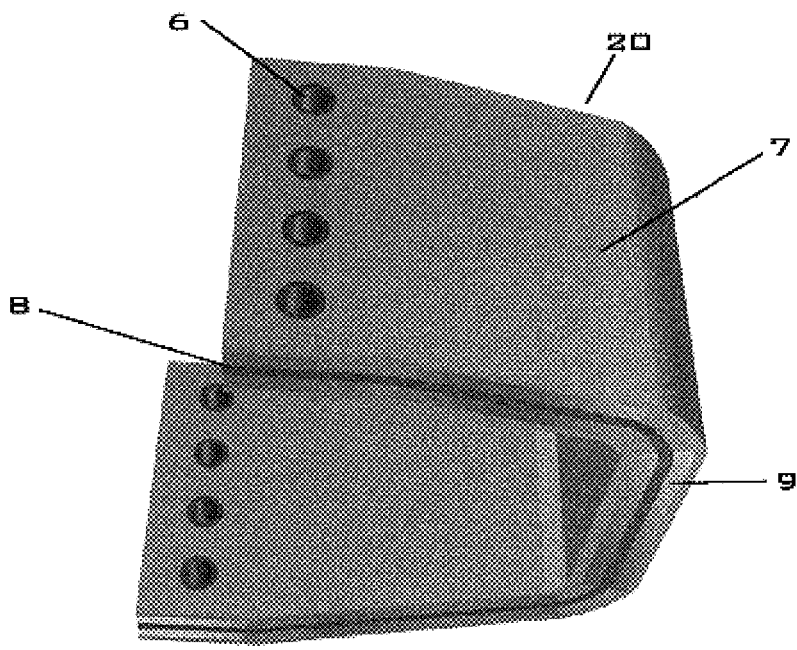
FIG. 2 shows a perspective view of an alternate embodiment of the passive C-mount.
Figure 8:
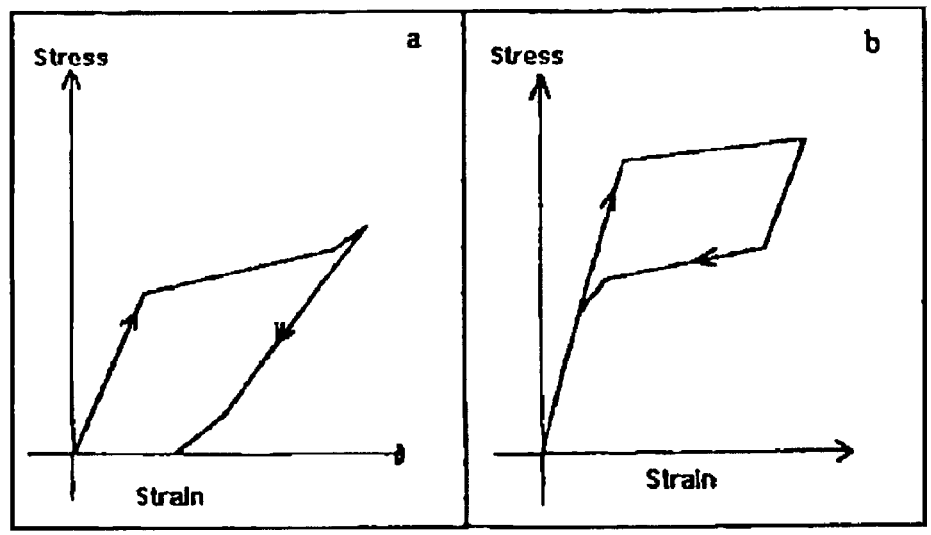
FIG. 8 describes the hysteresis of a representative super-elastic alloy.

An alternate embodiment of the C-mount isolator 20 consists of a rigid element 8 onto which is attached damping elements 9, either magneto-mechanical or superelastic alloys, thereafter encased within a composite shell 7, as shown in FIG. 2. The composite shell 7 is composed of an extruded, cast, or molded fiber-reinforced plastic. The composite shell 7 is sandwiched between a first layer 1 and a second layer 2. Damping elements 9 may consist of one or more continuous layers or segmented elements along the length of the C-mount isolator 20. Damping elements 9 may be composed of a material that transforms elastic-mechanical energy into heat, also known as a superelastic alloy. FIG. 8 graphically describes the hysteresis characteristics of a typical superelastic alloy in the stress-strain plane. The leftmost graph shows a conventional shape memory alloy, whereas the rightmost shows the same material functioning at a superelastic phase. In still other embodiments, damping elements 9 are composed of one or more magneto-mechanical and superelastic alloys.

Referring now to FIG. 14, FIG. 14a shows an unconstrained polymer damped mount 35 from the related arts wherein the laminate is neither constrained nor segmented. Damping is introduced by bonding (EAR 20003C) viscoelastic polymer to a series 1B or 2A C-Worthy mount manufactured by Northrop Grumman. Constraining introduces large shear into the polymer during shock and vibration causing lose through material hysteresis. A constrained mount 35 is shown in FIG. 14b comprised of a damping layer 36 disposed between and attached to mount 35 and damping plate 37. The segmented PCLD treatment shown in FIG. 14b is either single or double sided. FIGS. 13b and 13d show various embodiments of the constrained mount 35. Preferably, damping layer 36 and/or damping plate 37 should be positioned at locations of maximum strain. TABLE 1 summarizes the increased damping as a function of frequency achieved with unconstrained mounts 35 described in FIGS. 13 and 14. TABLE 2 summarizes the increased damping as a function of amplitude achieved with unconstrained mounts 35 described in FIGS. 13 and 14.

TABLE 1

| Treatment | Deflection 1 Hz 0.05 inches | Deflection 1 Hz 0.1 inches | Deflection 1 Hz 0.15 inches | Deflection 1 Hz 0.25 inches |
|---|---|---|---|---|
| Magneto-strictive | 29.02% | 44.87% | 40.64% | 47.32% |
| Viscoelastic | 38.28% | 47.7% | 52.27% | 57.17% |
| Superelastic | 44.92% | 30.37% | 43.4% | 46.4% |

TABLE 2

| Treatment | Deflection 1 Hz 0.05 inches | Deflection 2 Hz 0.05 inches | Deflection 3 Hz 0.05 inches | Deflection 4 Hz 0.05 inches |
|---|---|---|---|---|
| Magneto-strictive | 29.02% | 26.8% | 35.88% | 39.86% |
| Viscoelastic | 38.28% | 35.8% | 38.31% | 49.1% |
| Superelastic | 44.92% | 46.35% | 40.64% | 47.32% |

Figure 6:
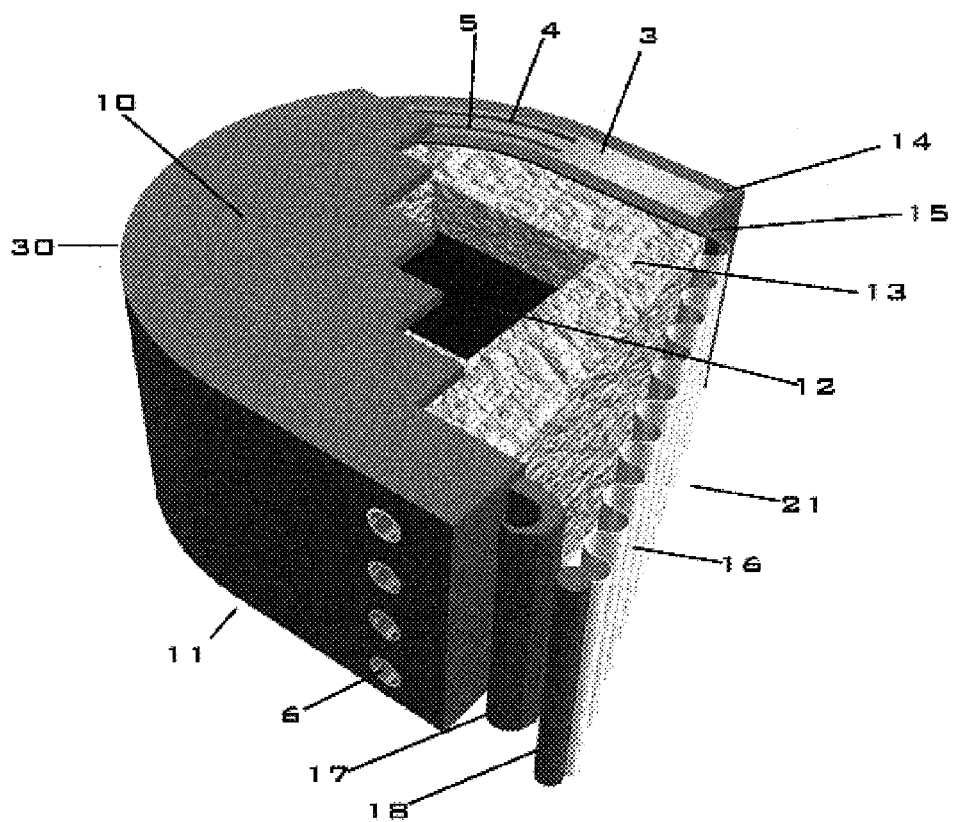
FIG. 6 shows a perspective view of a representative active-passive D-mount.
Figure 11:
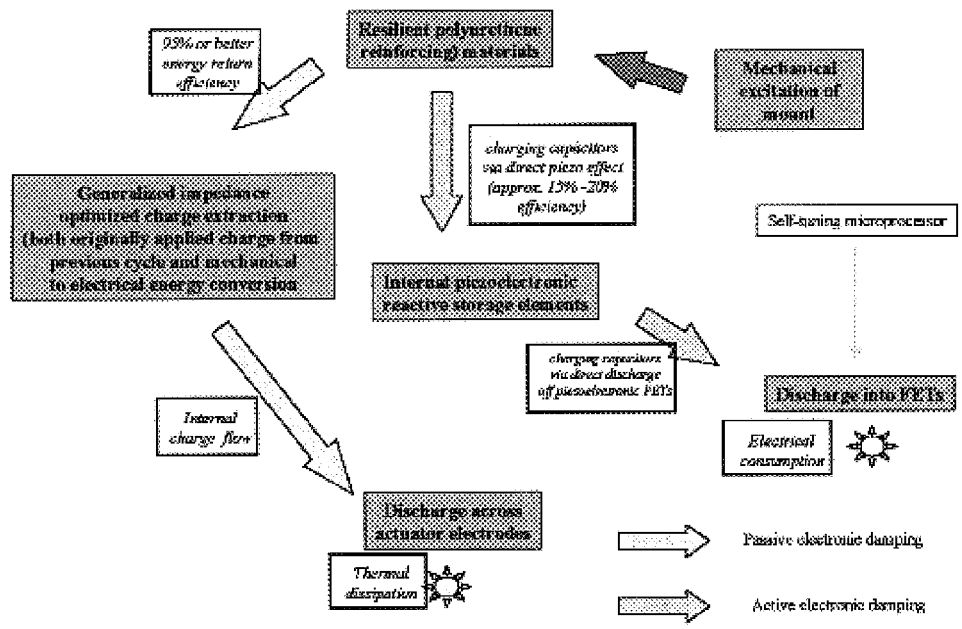
FIG. 11 shows a schematic diagram for electronic damping via dynamic impedance.

FIG. 6 shows an active-passive embodiment of the present invention, referred to as a D-mount isolator 30. A typical D-mount isolator 30 is a fully enclosed unit with an electronics module 12 secured within a fill 13 of low-density material, including but not limited to foam. The electronics module 12 dissipates mechanical excitations via active electronic damping or via passive electronic damping, as described in FIG. 11. A third damping layer 3 with one or more first inserts 4 and second inserts 5 are enclosed between an outer damping shell 14 and an inner damping bulkhead 15. Outer damping shell 14 and inner damping bulkhead 15 are composed of an energy absorbing material capable of withstanding large repeated deflections and strains, preferably spring steel. Both outer damping shell 14 and inner damping bulkhead 15 provide structural rigidity and integrity during non-loading conditions. Fasteners 6 secure the outer damping shell 14, third layer 3, and inner damping bulkhead 15. A lightweight damping seal 16 is attached along the open end 21 of the D-mount isolator 30 and secured to the inner damping bulkhead 15 via a flange 17 and connector 18 arrangement. A top cover 10 and a bottom cover 11 are attached to the outer damping shell 14 and composed of a flexible, yet durable material capable of withstanding environmental conditions and contaminates present in ship-based applications.

The volume of the D-mount isolator 30 is in part determined by the electronics module 12. A small electronics module 12 is possible since magneto-mechanical effects are a function of field reversal. In the actively, passive embodiment, the controller is required to switch polarity and performed by a trans-impedance current source upstream. The switch mechanism requires a small H-bridge switcher, understood in the art, integrated within the D-mount isolator 30. The switcher resets the magneto-mechanical material after one or more loads are applied to the D-mount isolator 30.

The board plane of the electronics module 12 is oriented along the shock and vibration plane and encased within a low-density fill 13 to avoid shock and vibration damage to the electronics module 12. A top cover 10 and a bottom cover 11 consisting of a thin sheet of polyurethane are added to prevent oil/ozone/saltwater damage. A thick, bellowed polyurethane is introduced along the open end 21. The electronics module 12 is positioned so as to avoid the introduction of shock and vibration paths.

The polyurethane provides corrosion resistance and additional electronic damping via the direct piezoelectric effect of the urethane. The electrical converted elastic energy is coupled into a compact generalized impedance circuit mounted within the elastomeric portion of a C-mount isolator 20 or simply absorbed by the switcher H-bridge circuitry of the active D-mount isolator 30.

In the D-Mount isolator 30, the third damping layer 3, typically a fiber-reinforced silicon rubber, functions as an anti-corrosion shell and heat sink. When used adaptively in an active mode, the very same fiber-reinforced silicon rubber functions as a low frequency motion amplifier driven by high-power magneto-mechanical actuators.

The lightweight damping seal 16 is composed of corrugated polyurethane to dissipate incident wave energy through friction associated with liquid and solid phases of the foam. Polyurethane having a simple wave shape is embedded into the urethane foam and bonded to the surface of D-mount isolator 30 to create a distributed vibration absorber. The acoustic absorber integrates the distributed piezoelectric polymer between individual layers of absorbing foam in a thin sandwich. The sound absorbing material is a partially reticulated polyurethane foam.

Referring now to FIG. 6, the fill 13 is composed of a highly resilient polyurethane exhibiting higher direct coupling of elastic energy to electrical energy. The D-mount isolator 30 exhibits direct effect damping whereby energy is shunted as heat out of the system via a simple resonant tank circuit. In an alternate embodiment, urethane polymer strips are interlaced lengthwise with thicker directional fiber-reinforced high-strength, high-stiffness elastomer strips. The urethane extracts a small amount of energy at low frequency and a higher percentage of energy at higher frequency harmonics. The interlaced polymer functions as a shock mitigation cushion and the fiber-reinforced elastomer provides large force and rigidity with actuation under aerodynamic loading.

Figure 9:
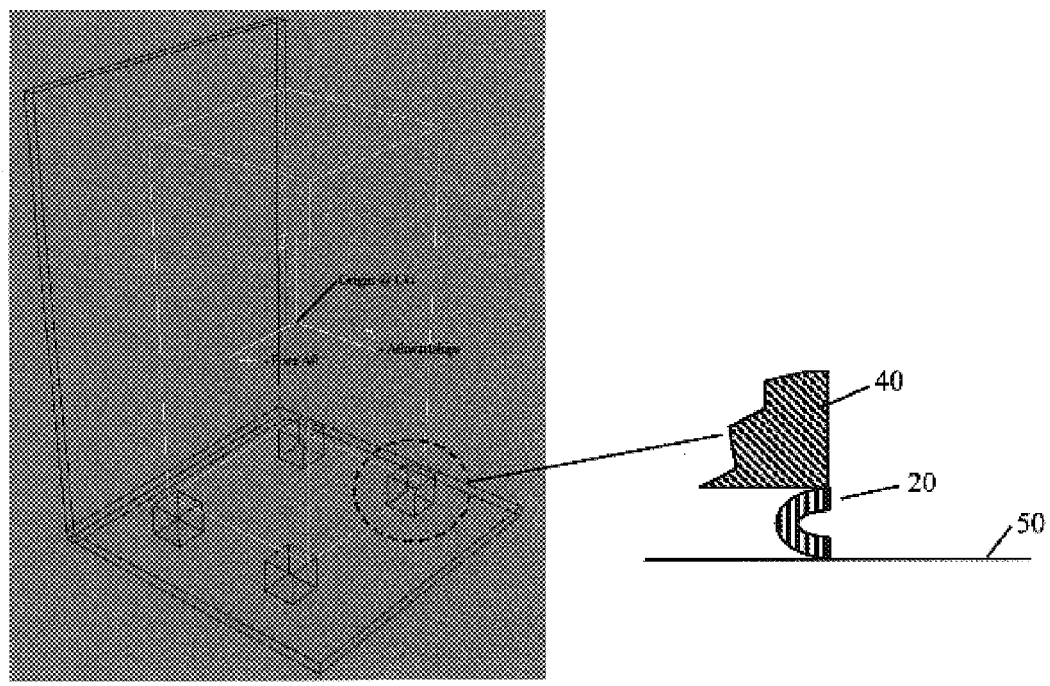
FIG. 9 shows a representative 4-point arrangement comprised of shock-vibration mounts.

Referring now to FIG. 9, four C-mount isolators 20 are disposed between a component 40 and a mounting surface 50 in a typical application. The described arrangement is equally applicable to D-mount isolators 30.

Figure 10:
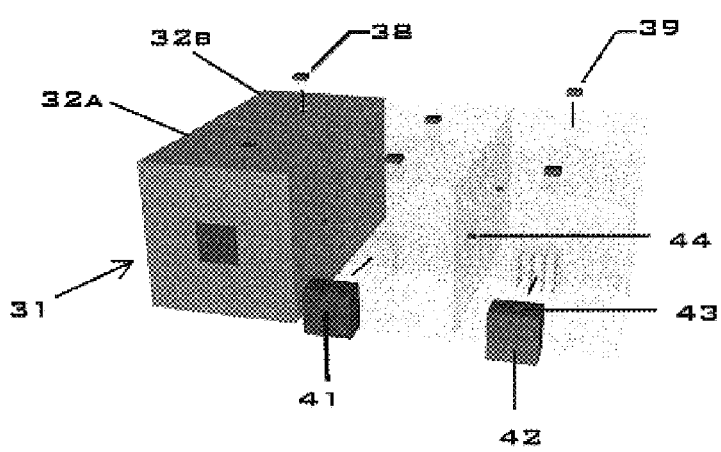
FIG. 10 shows a schematic diagram for a snap together multi-mount block system.

The isolators described herein facilitate interlock, thereby forming passive and active-passive implementations. FIG. 10 shows a representative snap together multi-mount block 31. Each block 32 is representative of a C-mount isolator 20 or D-mount isolator 30. Active mode devices require a microsensor and a self-tuning microprocessor per set.

Snap connectors between blocks 32 enable both x-axis and y-axis signal and power conductivity. Jumper option selects signal and power conductivity paths enabling individual blocks 32 to be configured in a variety of options. The terminal unit is the only unit that has a rubber-shielded microprocessor insert. The remaining units have resilient rubber cap inserts. The system utilizes either a single sensor, the preferred embodiment employing a silicon MEMS device, or sensors in several units within a distributed controller design. The remaining units have flexible inserts. The described system is self-encapsulated and requires a single upstream trans-impedance current source.

The multi-mount block 31 may be attached to a spring-loaded canister and thereafter clamped to a pipe. Temperature compensation may be in-built by adjusting a reset magnetic circuit in the magneto-mechanical portion of the system.

Figure 12:
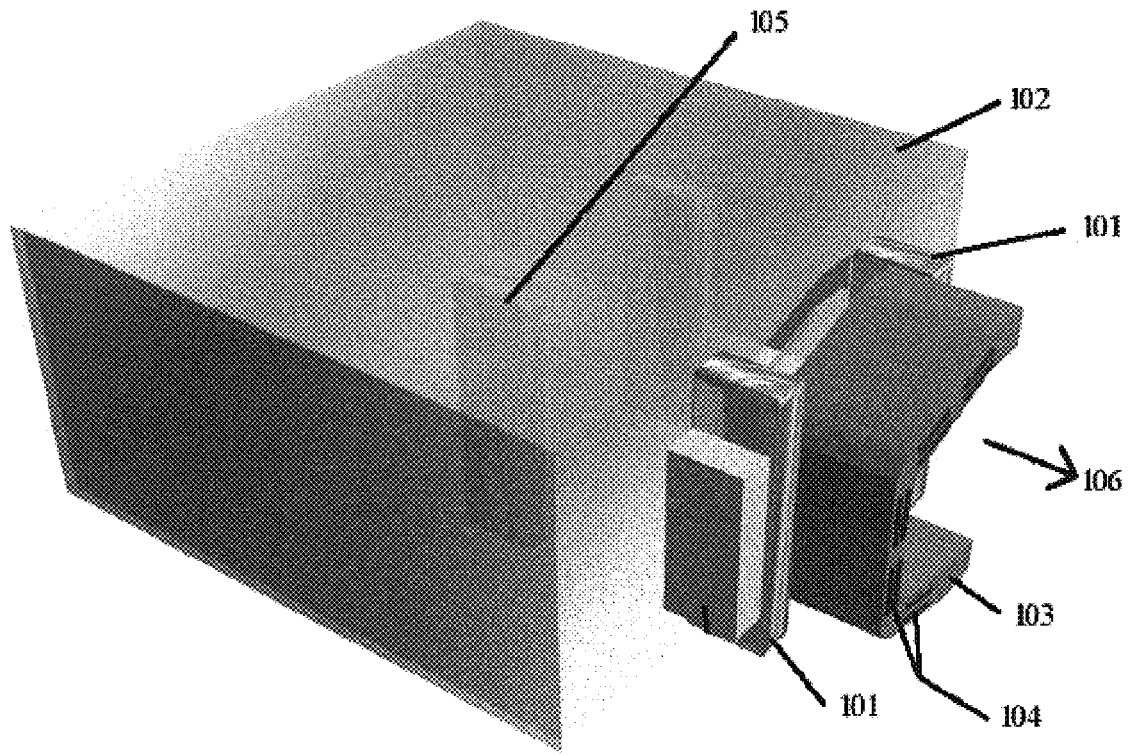
FIG. 12 shows solidification equipment for the oriented manufacture of a magnetostrictive composite.

FIG. 12 shows one possible orientation of the preferred manufacture process whereby the solidification of the ferro-magnetic powder into pseudo-chains after extrusion is enabled by a pair of alignment devices 101. The alignment devices 101 are so aligned and flush mounted at the extrusion exit so as to induce magnetic flux lines in a desired orientation within the first insert 4 and second insert 5 or dampening element 9 during the cooling process. As the material extrudes in the extrusion direction 106, the alignment devices 101 induce the desired solidification alignment. A second set of alignment devices 105 may be integral within the machine 102 so as to induce additional pre-alignment during the heating process. Example machines 102 include injection molding or extrusion, both known within the plastics fabrication art.

The emergent composite 103 may also include one or more pre-aligned damping materials 104. Damping materials 104 are integrated into the composite 103, for example a short fiber-reinforced elastomer, during actual extrusion. The composite 103 is cleaved to the desired length after exiting the machine 102. The alignment devices 101 include permanent magnets, magnetic field effect devices, EMP (electro-magnetic pulse) inducing equipment, or cool magnets.

Referring to FIG. 12, the fabrication process uses a stationary high magnetic flux density arrangement that causes alignment as the material extrudes and before cooling can initiate. The damping alloy particles must be aligned at high temperature, since the particles lose their ferromagnetic property as the form cools. This is actually advantageous to semi-passive mount isolator design. The disappearance of magnetic response by the magnetostrictive particulates opens up the possibility of introducing a second set of magnetic particles such as AlNiCa that can now be used to "internally" tune, the mounts damping parameters. The idea is, that a static magnet or coil induces the necessary magnetic bias across the mount and the system becomes an RL equivalent circuit. As this static value is changed, an externally placed resistance is modified through simple (dial-up) rotation of NdCo bias magnets.

As the polymer emerges from the die with some exit velocity, it is pulled by take-up equipment through a cooling medium, such as a water bath. A key process variable is the take-up ratio (TUR) of line velocity to exit velocity. The line velocity established by the take-up equipment is generally higher than the die exit velocity.

The main challenge to using extrusion manufacture lies in the nature of molecular alignment during extrusion. Due to the parabolic nature of the velocity profile, there is a high tendency for alignment in the machine direction. That is with an L/D of typically 10, the alignment of molecules or fiber whiskers will be in the direction of the flow field at the dylet.

Figure 15:
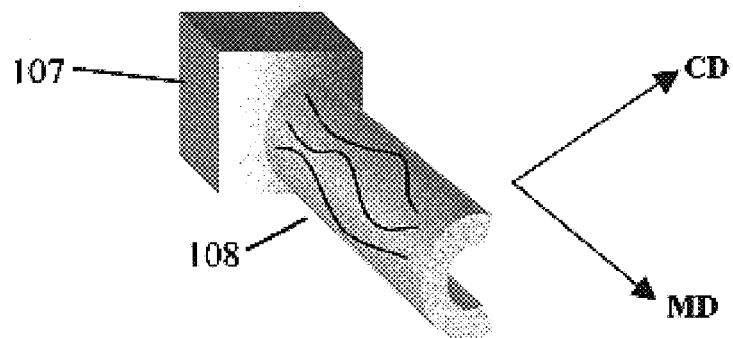
FIG. 15 shows an extruded C-mount with machine-direction molecular orientation.

Molecular orientation of the polymer is an important characteristic that determines the 'final mechanical properties of' the product. In conventional extrusion processes, the predominait orientation is in the direction that the polymer emerges from the die, called the machine direction (MD). FIG. 15 shows an exaggerated representation of this structure. The difficulty is that due to this molecular alignment process in the machine direction, the main stress strength capability of the resultant piece will also be the machine direction axis. The mechanical strength in the vertical axis of the mount as currently designed would not be particularly high.

Two mechanisms contribute to MD orientation. First, as the polymer flows through the die, the shear stress on the chain-like molecules causes them to orient in the direction of flow. Then, as the oriented molecules emerge from the die, a TUR greater than one causes stretching of the melt that leads to further MD orientation. This structure is frozen-in as the polymer solidifies in the cooling medium.

When a product has a predominant direction of orientation, it is said to have anisotropic (unbalanced) properties. For the case of tensile strength, anisotropy results in a product stronger in the direction of orientation and weaker in the direction perpendicular to the orientation. Application of the c-shaped mount leads to tensile stresses in the direction perpendicular to MD, called the cross direction (CD), also known as the transverse direction. Therefore, it would be advantageous to extrude the c-shaped mount in a manner that promotes CD orientation.

Figure 16:
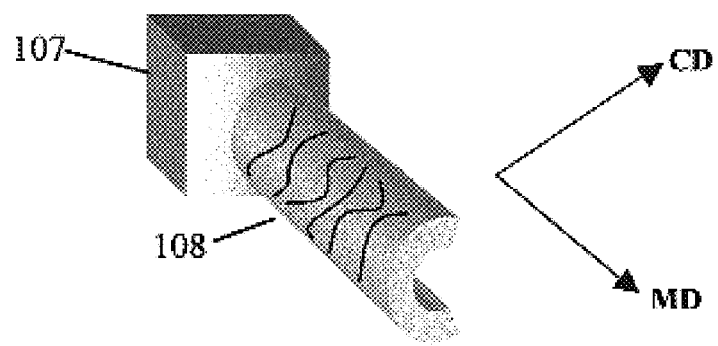
FIG. 16 shows an extruded C-mount with cross-directional molecular orientation.

There exists a non-conventional extrusion technique for promoting CD orientation. In this process, shear flow is used to align the molecules in the cross direction. Furthermore, proper design of the TUR would lead to minimal MD orientation. Producing the c-shaped mount in this way would result in the necessary tensile strength for sustaining applied loads. FIG. 16 shows an exaggerated representation of a c-shaped mount extruded with CD orientation.

Magnetic particles (e.g., commercial grade AlNiCo) are introduced directly into the composite 103 at Curie temperature below the magnetization temperature of the ferromagnetic particulate to create an internal, and moreover tunable, RL equivalent impedance of the c-shaped mount itself.

Preferred embodiments are composed of Magnetic Shape Memory material wherein the magnetic field moves microscopic parts of the material, called twins, creating a netshape change of the material. The mechanism also enables more complicated shape changes than conventional linear strain, such as bending and shear, or FMSA powder/polymer microcomposites, the FMSA particles are made with a layer of soft magnetic material (e.g. Fe—Co) to enhance response to magnetic fields by exchange coupling for reduced DC hysteresis, lower eddy-current loss and lower actuation field. The low actuation field makes them particularly attractive to enabling quasi-static tuning of mounts for variable load applications.

Short fibers are added to the composite 103 during the manufacturing process to form a polymeric treatment becoming an integral part of the c-shaped mount exterior lamination. Adjusting the spacing between and/or length of the fibers optimize the damping characteristics of the treatment either during or after the manufacturing process. The resulting treatment provides increased vibration damping without a constraining layer. Fiber orientation is critical to the effective attenuation of vibration.

The description above indicates that a great degree of flexibility is offered in terms of the invention. Although the present invention has been described in considerable detail with reference to certain preferred versions thereof, other versions are possible. Therefore, the spirit and scope of the appended claims should not be limited to the description of the preferred versions contained herein.

What is claimed is:

1. A passive isolator mount for shock and vibration isolation comprising:
   (a) a rigid first layer capable of withstanding repeated deflections and strains;
   (b) a rigid second layer capable of withstanding repeated deflections and strains;
   (c) a fiber-reinforced third layer composed of an energy damping material disposed between said first layer and said second layer; and
   (d) at least one energy dissipating alloy layer enclosed within and pre-stressed by said third layer, said third layer disposed between said energy dissipating alloy layer and each of said first layer and said second layer, said third layer coupling mechanical energy into said energy dissipating alloy-layer for conversion to heat or magnetism.

2. The passive isolator mount of claim 1, wherein said passive isolator mount is c-shaped.

3. The passive isolator mount of claim 1, wherein said third layer is a constrained layer of viscoelastic material.

4. The passive isolator mount of claim 1, wherein said first layer, said second layer and said third layer are multiply applied to form a multi-laminate structure.

5. The passive isolator mount of claim 1, wherein said first layer and said second layer are composed of a thermoplastic.

6. The passive isolator mount of claim 5, wherein said first layer and said second layer having short fiber inclusions.

7. The passive isolator mount of claim 1, wherein each said energy dissipating alloy layer has embedded particulates oriented in a preferred direction to enhance damping.

* * * * *